United States Patent [19]

Tokuno

[11] 4,425,695
[45] Jan. 17, 1984

[54] ROLLS FOR USE IN CORRUGATED FIBREBOARD PRODUCTION SYSTEM

[75] Inventor: Masateru Tokuno, Nishinomiya, Japan

[73] Assignee: Rengo Kabushiki Kaisha (Rengo Co., Ltd.), Osaka, Japan

[21] Appl. No.: 252,607

[22] Filed: Apr. 9, 1981

Related U.S. Application Data

[63] Continuation-in-part of Ser. No. 111,476, Jan. 7, 1980, abandoned.

[30] Foreign Application Priority Data

Jan. 16, 1979 [JP] Japan .................................. 54-3759
Apr. 13, 1979 [JP] Japan ................................ 54-45577
May 29, 1980 [JP] Japan ........................... 55-74839[U]

[51] Int. Cl.³ .............................................. B21B 27/02
[52] U.S. Cl. ................................ 29/113 R; 29/121.1; 29/121.4
[58] Field of Search ................. 29/121.1, 121.2, 121.4, 29/113 R, 113 AD, 128, 127, 130, 132; 26/97, 99, 104, 105

[56] References Cited

U.S. PATENT DOCUMENTS

| | | | |
|---|---|---|---|
| 2,158,115 | 5/1939 | Fullilove | 29/121.4 X |
| 2,545,905 | 3/1951 | Thomas | 29/121.4 X |
| 2,741,014 | 4/1956 | Hubbard | 29/130 |
| 2,849,192 | 8/1958 | Fairchild | 29/113 R |
| 3,060,545 | 10/1962 | Thiel et al. | 29/121.5 X |
| 3,235,906 | 2/1966 | Conti | 29/113 R X |
| 3,253,323 | 5/1966 | Saueressig | 29/113 R |
| 3,707,749 | 1/1973 | Henley | 29/113 R |

FOREIGN PATENT DOCUMENTS

| | | | |
|---|---|---|---|
| 235788 | 9/1964 | Austria | 29/113 R |
| 83825 | 3/1895 | Fed. Rep. of Germany | 29/113 R |
| 473014 | 6/1952 | Italy | 29/113 R |
| 105038 | 7/1942 | Sweden | 29/113 R |
| 480699 | 2/1938 | United Kingdom | 29/113 R |
| 1088213 | 10/1967 | United Kingdom | 26/99 |

*Primary Examiner*—Eugene F. Desmond
*Attorney, Agent, or Firm*—Wenderoth, Lind & Ponack

[57] ABSTRACT

Rolls having an elasticity on their outer periphery are used in corrugated fibreboard producing and processing machines. Tubes or tubular sheet adapted to be inflated with gas, elastic cords or strings, elastic tubular sheets, or tubular sheets with air bubbles thereon or therein are used to at least partially cover the outer surface of the rolls, thus giving the rolls an elasticity.

13 Claims, 21 Drawing Figures

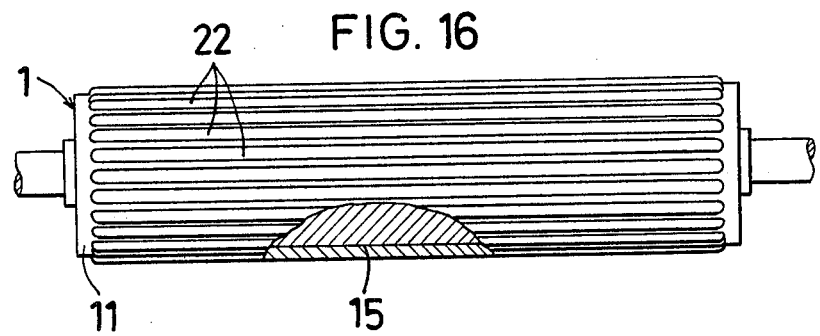
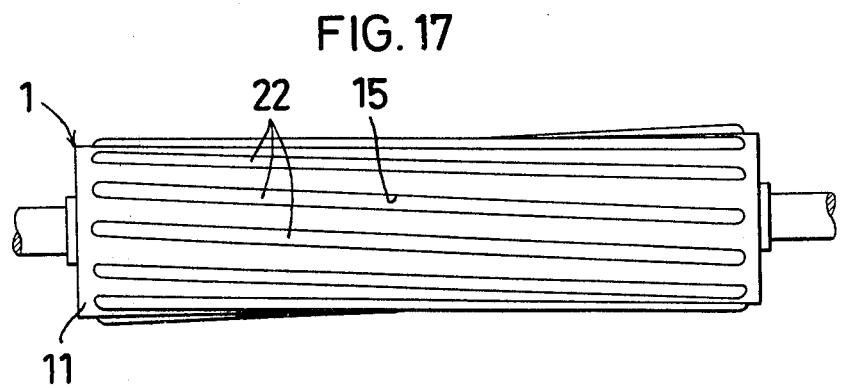
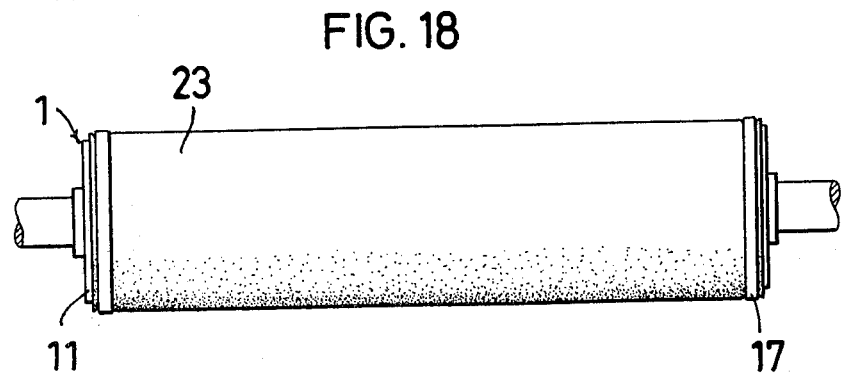
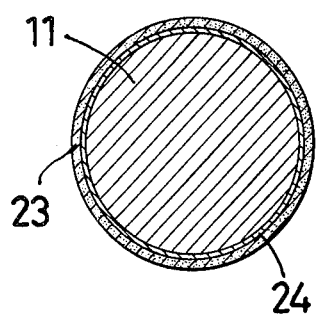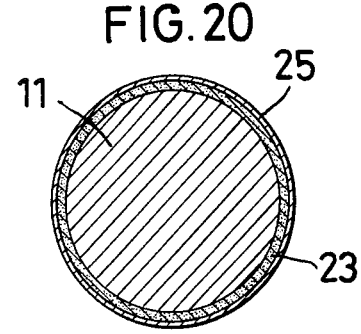

ROLLS FOR USE IN CORRUGATED FIBREBOARD PRODUCTION SYSTEM

This is a continuation-in-part of application Ser. No. 111,476, filed Jan. 7, 1980 now abandoned.

BACKGROUND OF THE INVENTION

The present invention relates to improvements in rolls for use in corrugated fibreboard production and processing machines.

The roll according to the present invention is intended for use as a rider roll in the gluing portion of a corrugating machine, a weight roll in its heating portion, a feed roll arranged before a rotary cutter, and a feed roll in corrugated fibreboard processing machines such as a printer, a folder-gluer and a rotary die cutter.

Generally, single-faced or double-faced corrugated fibreboards are liable to have their corrugations crushed or deformed when nipped between rolls. This tendency is marked particularly when the liner used is thin.

In the corrugated fibreboard industry, it has heretofore been a large problem to prevent such a deformation of the corrugations, thereby maintaining the thickness of corrugated fibreboard which is its life.

At the gluing portion of a corrugating machine for producing corrugated fibreboards, a glue roll is provided to apply glue to the peaks of the corrugations of a single-faced corrugated fibreboard web fed from the preceding station. Over the glue roll is arranged a heavy rider roll made of steel. The rider roll having its shaft supported by a lever is usually set to lightly press the web against the glue roll to prevent poor gluing due to uneven application of glue.

The rider roll presses the web from its liner side. In addition to unevenness due to some irregularity in the flute height (what is called "high-low") formed during the corrugating process, the liner surface is not even but tends to be lower at the portions facing the bottoms of the corrugations than at the portions facing their peaks. Further, the conventional rider roll contacts the web substantially on a line or tangentially. Therefore, the rider roll is usually set for its bottom to contact the lower portions of the liner or set at an even lower position for secure gluing. The lever mechanism supporting the rider roll is provided with a stopper to prevent the rider roll from lowering from its preset position. The lever allows upward movement of the rider roll but which is too heavy to be moved upwardly. Because the arrangement is such as mentioned above, the corrugations are deformed more or less when the corrugated fibreboard web is nipped between the glue roll and the rider roll.

Also, with the conventional rider roll made of steel, since it has to be set so as to lightly press the web, there is a tendency that a more than necessary amount of glue is applied to the peaks of the corrugations. This results in poor economy and in that the single-faced web absorbs an excessive amount of moisture.

Excessive absorption of moisture is undesirable for the following reasons. Firstly, the corrugated fibreboard web would soften so much owing to excess moisture that it would become more liable to have its corrugations deformed when passed between rolls at succeeding steps.

Secondly, the web would have to absorb a greater amount of heat at the heating portion which comes after the gluing portion. This means a greater loss of heat energy. Also, the web would have to stay at the heating portion for a longer time. This decreases the machine speed and thus the production per unit time. Furthermore, the pressure applied to the web against the heating plates has to be increased for better heat absorption. This also makes the web more liable to have its corrugations deformed.

Thirdly, an excessive amount of moisture makes the corrugated fibreboard web more liable to warp, which might cause machine trouble and produce defective webs.

Whenever the liner used changes, the clearance between the glue roll and the rider roll has to be readjusted. This adjustment is very troublesome and requires a high degree of skill. Readjustment of the clearance is also required when the type of corrugation or flute changes. Therefore, a particular set of a rider roll and a glue roll having the clearance therebetween preadjusted is usually prepared for each type of flute.

At the heating portion of the corrugating machine, a number of weight rolls made of steel are arranged to press the corrugated fibreboard web against the heating plates through a cotton belt for better heat conduction. Each weight roll has its shaft supported by a lever or a wedge adapted to allow adjustment of the pressure applied to the web.

The larger is the pressure applied by the weight rolls to the web, the better is the gluing and the higher is the machine speed which can be expected, but the greater would be the possibility of causing deformation of the corrugations. Since the weight rolls press the web through the cotton belt on a line or tangentially, the pressure applied to the web is considerably large even though the web is pressed not directly but through the cotton belt.

When the joints of the cotton belt where the belt sections are joined as by lacing and its bulging portions where some foreign matter is attached pass under the weight rolls, the rolls will skip, thus applying excessive pressure to the web and causing deformation of its corrugations.

At the heating portion also the clearance between the weight rolls and the heating plates has to be readjusted according to the flute type, material, etc. of the corrugated fibreboard web.

The deformation of the corrugations is most likely to occur at the processes where the web contains a relatively large amount of moisture, i.e. at the glueing portion and the heating portion.

Next, a pair of feed rolls made of steel are arranged upstream of a rotary cutter of the corrugating machine to feed the corrugated fibreboard web toward the rotary cutter. The feed rolls are rotated at a slightly higher speed than the feed speed of the web to feed the web without letting it accumulate before the rotary cutter. Thus, the web is fed to the rotary cutter while being slightly pulled by the feed rolls.

With the conventional steel feed roll, the upper and lower feed rolls contact the corrugated fibreboard web substantially tangentially on a transverse line. Therefore, in order to feed the web while slightly pulling it, the pair of the feed rolls have to nip the web with a considerable pressure, thus causing deformation of the corrugated fibreboard web.

Pairs of steel feed rolls are also used in other corrugated fibreboard processing machines such as a printer, a folder-gluer and a rotary die cutter. On these machines also, deformation of the corrugations can occur owing to the nip force applied by the feed rolls. Also, deformation can occur at auxiliary feed rolls and processing rolls provided in such processing machines.

An object of the present invention is to provide rolls for use in corrugated fibreboard production and processing machines having an elasticity on their outer periphery to prevent deformation of the corrugations without the need of frequent readjustment of the clearance between the rolls according to changes of the material, flute type, etc.

BRIEF DESCRIPTION OF THE DRAWINGS

Other features and advantages of the present invention will become apparent from the following description taken with reference to the accompanying drawings, in which:

FIGS. 3 to 18 are partly sectional views of various embodiments of the present invention;

FIG. 19 is a sectional view of a variant of the embodiment of FIG. 18;

FIG. 20 is a sectional view of another variant of the embodiment of FIG. 18.

DETAILED DESCRIPTION OF THE INVENTION

Figure 1:
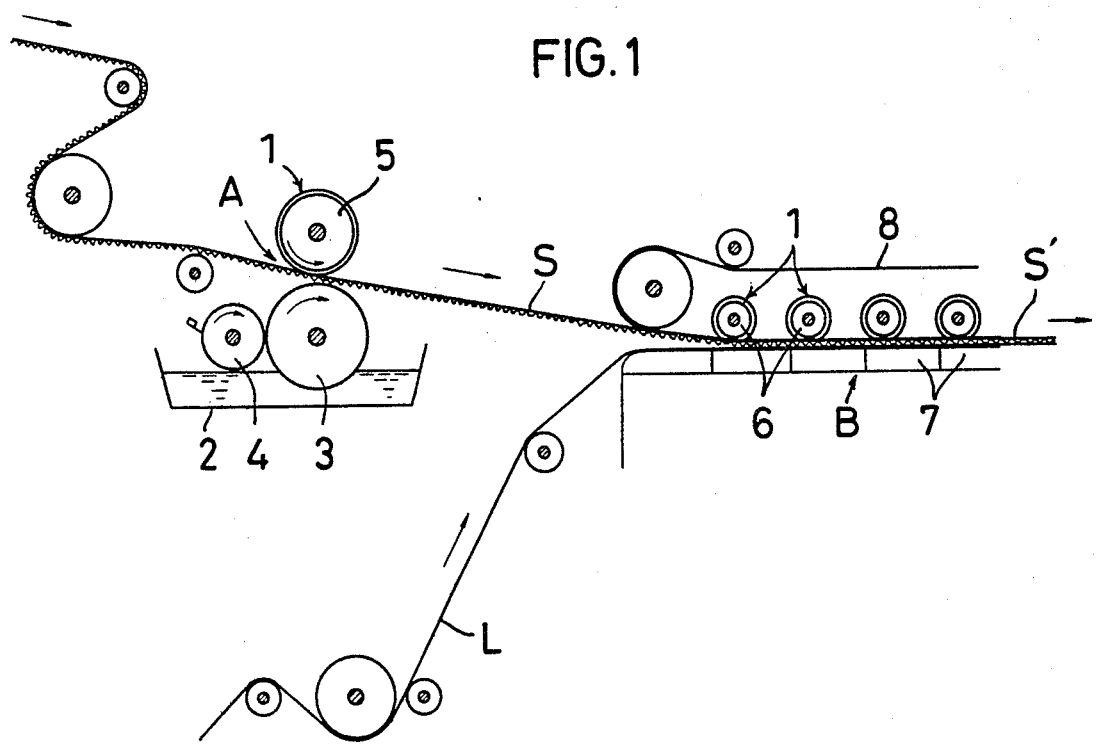
FIG. 1 is a schematic view showing how rolls according to the present invention are to be used in the gluing portion and the heating portion of a corrugating machine.

Throughout the drawings, the same or like reference numerals are used to designate like or corresponding elements.

FIG. 1 shows a gluing portion A and a heating portion B of a corrugating machine where the rolls 1 according to this invention are used as rider rolls and weight rolls, respectively.

The gluing portion A consists generally of a glue pan 2, a glue roll 3 partially immersed in the glue in the glue pan 2, a doctor roll 4 for adjusting the amount of the glue applied to the glue roll, and a rider roll 5 which rotates against the glue roll 3 with a single-faced corrugated fibreboard web S to be glued nipped therebetween.

A liner L is adhered on to the thus glued web, and the double-faced web S' is then dried at the heating portion B where it is pressed by the weight rolls 6 against the heating plates 7 through a cotton belt 8.

Figure 2:
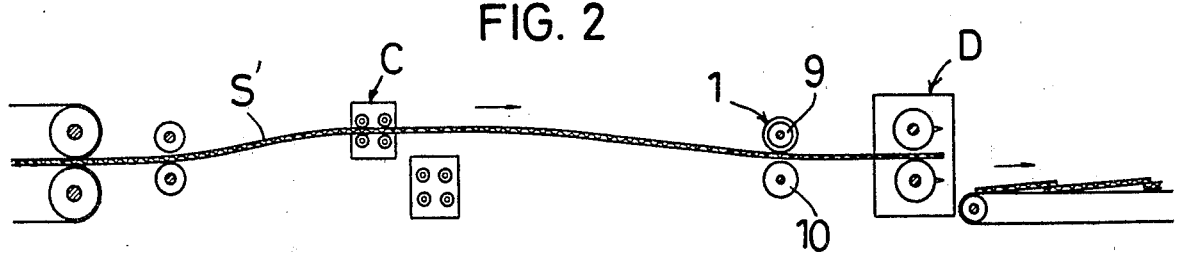
FIG. 2 is a schematic view showing how the roll is to be used at a succeeding portion of the corrugating machine.

FIG. 2 shows a part of the corrugating machine where the double-faced corrugated fibreboard web S' passes through a slitter-scorer C and is fed by a pair of feed rolls 9, 10 to a rotary cutter D. The lower feed roll 10 may be replaced with a guide plate. The upper feed roll 9 is usually set to rotate at a slightly higher speed than the speed of the web to pull it.

Although in the example of FIG. 2 the roll 1 according to this invention is used only for the upper feed roll 9, it may be used for both of the feed rolls or only for the lower feed roll 10.

Various embodiments of the roll according to this invention shall be described with reference to FIGS. 3 to 21.

The first group of embodiments illustrated in FIGS. 3 to 7 are rolls which include a roll body covered with one or more tubes which are made of natural or synthetic rubber or a synthetic resin material having flexibility but not having gas permeability, such tubes being adapted to be inflated by forcing gas thereinto to give the roll elasticity.

Figure 3:
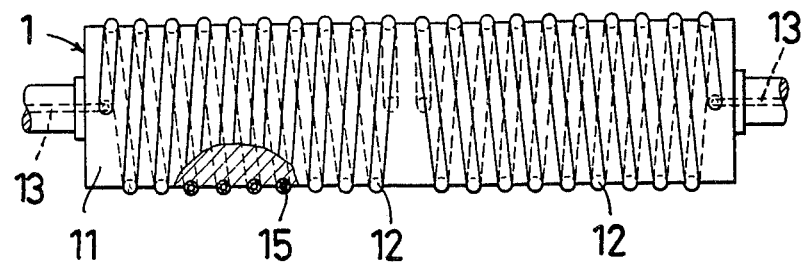

Referring first to FIG. 3, the roll 1 comprises a roll body 11 and two tubes 12 spirally wound around the roll body, the roll body having a gas supply passage 13 for forcing gas such as air into the tubes 12. Each tube end may be connected to the passage 13 by means of a joint which serves also as means for securing the tube. The tube may be secured by any other means such as adhesives and adhesive tapes.

Gas may be forced into the tube through a hose (not shown) connected to the gas supply passage 13 through a rotary joint.

The roll body 11 is provided with a spiral groove 15 in its outer periphery to partially receive the tubes 12 for secure mounting of the tubes into which air has been forced.

The embodiment of FIG. 3 is adapted to wind two tubes 12 spirally around the roll body in opposite directions, starting from the center toward each end, to prevent the web from running out of true.

Figure 4:
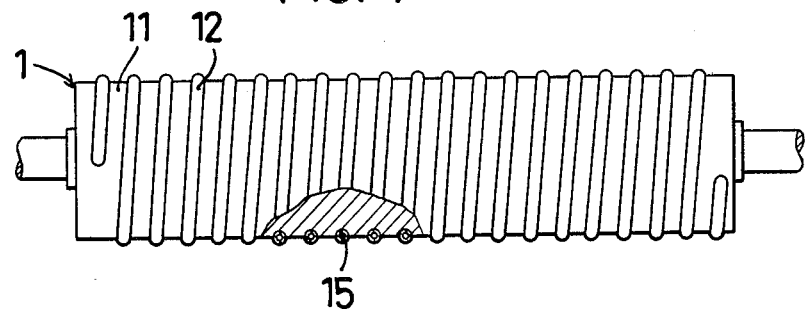

The embodiment of FIG. 4 is substantially the same as the embodiment of FIG. 3 except that a single tube 12 is spirally wound around the roll body in the spiral groove 15 in a single direction. In case the speed of the roll 1 is high or its width is relatively small, the web would not run out of true even if the tube is wound around the roll body in a single direction as in this embodiment.

Figure 5:
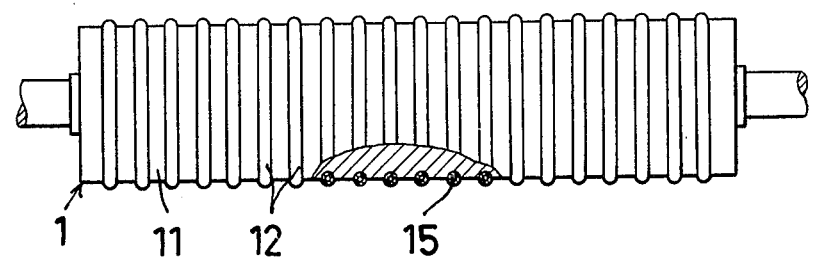

The embodiment of FIG. 5 comprises a roll body 11 provided with a plurality of annular grooves 15 in its outer periphery and as many annular tubes 12 mounted in such annular grooves.

In the embodiments of FIGS. 3, 4 and 5, gas may be supplied through a gas supply part 14 having a plug which will be described later with reference to FIGS. 6 and 7. In this case, the passage 13 and the rotary joint are not needed, of course.

Figure 6:
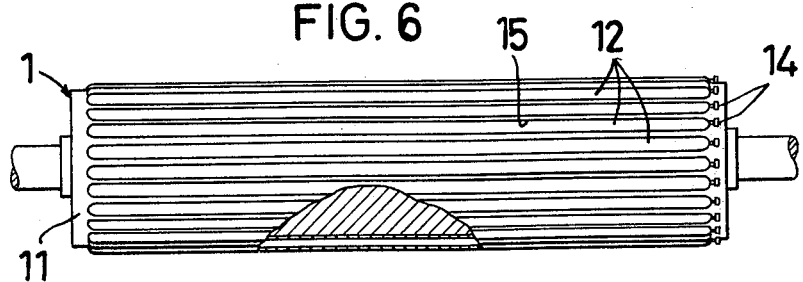

The embodiment of FIG. 6 comprises the roll body 11 and a plurality of tubes 12 mounted on the roll body parallel with one another and with the axis of the roll body, each of the tubes being provided with a gas supply port 14 having a plug.

Figure 7:
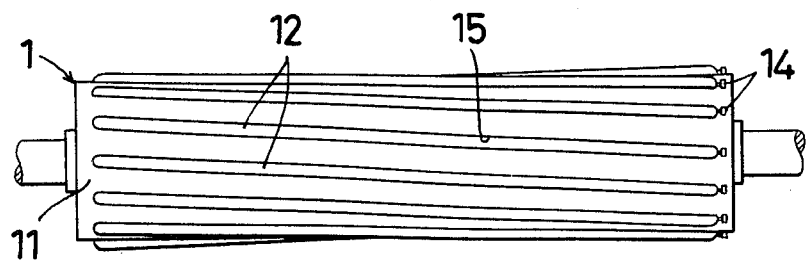

In the embodiment of FIG. 7, a plurality of tubes 12 are mounted on the roll body 11 at an angle with respect to the axis of the roll body.

The embodiments of FIGS. 4–7 may be provided with the gas supply passage 13, the grooves 15, joints for connecting the tubes 12 with the gas supply passage 13, and a rotary joint for connecting a hose with the gas supply passage as necessity arises, though some such combinations are not shown in the drawings.

Instead of supplying gas through a plugged gas supply port 14, gas may be injected into the tube with an injector or a syringe if the wall thickness and material of the tube 12 are such as to insure gas-tightness after the injector has been removed from the tube.

In the embodiments of FIGS. 3 to 7, the distance between the adjacent tube sections should be such as not to interfere with normal feeding of the corrugated fibreboard web.

Next, a second group of embodiments will be described with reference to FIGS. 8 to 11. They have one or more tubular sheets put on the roll body and secured thereto at each end, gas being forced into a space formed between the tubular sheet and the outer periphery of the roll body, thereby giving the roll surface an elasticity. The tubular sheet is made of a material having flexibility but no gas permeability, such as natural or synthetic rubber or a synthetic resin material.

Figure 8:
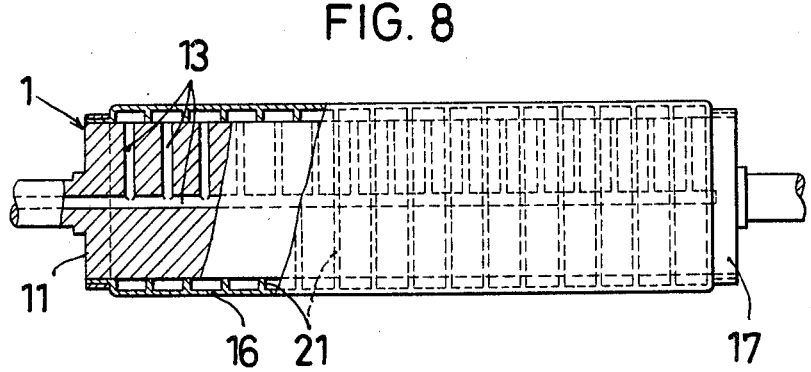

The embodiment of FIG. 8 comprises the roll body 11, a tubular sheet 16 mounted on the roll body, and bands 17 for securing the tubular sheet to the roll body at each end thereof. The bands may be replaced with adhesive or adhesive tape. Air is forced into a space formed between the tubular sheet 16 and the roll body 11 through the gas supply passages 13 axially and radially formed in the roll body. The tubular sheet is provided on its inner wall with annular ribs 21 as seal means to separate the above-mentioned space into a plurality of sections. This separation is done to prevent the tubular sheet 16 from bulging in the form of a barrel when gas is blown into the space.

Figure 9:
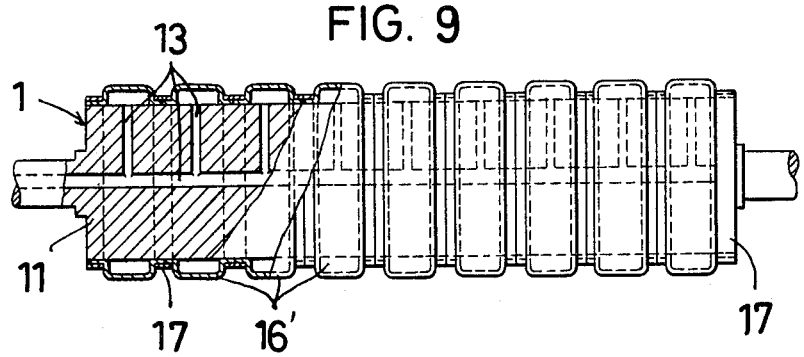
Figure 21:
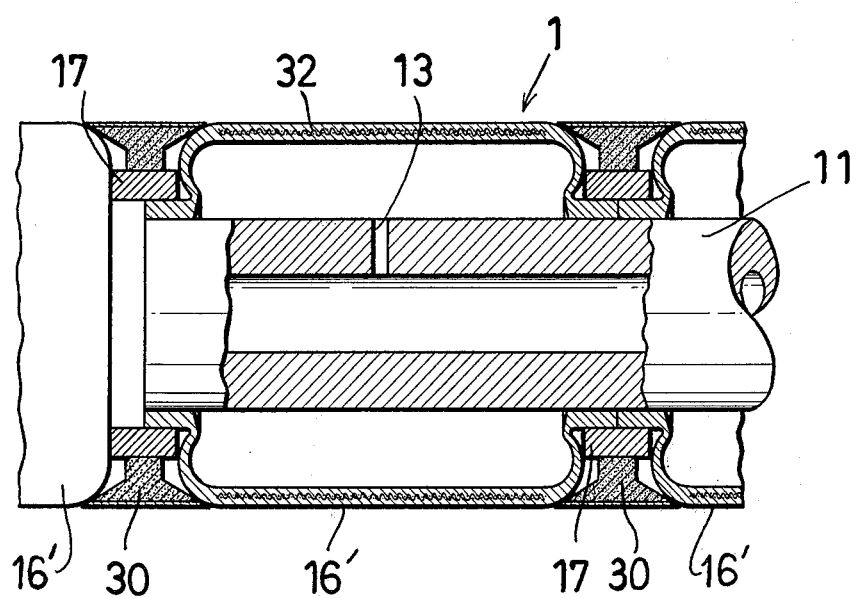
FIG. 21 is an enlarged section of a modification of the roll of FIG. 9.

The embodiment of FIG. 9 comprises the roll body 11, a plurality of relatively narrow tubular sheets 16' mounted on the roll body, seal means such as bands 17 for securing the tubular sheets at each end thereof and making gas-tight the spaces formed between the roll body and the tubular sheets. Air is blown into the spaces through the air supply passage 13 formed in the roll body 11. Referring to FIG. 21 which is an enlarged sectional view of a modification of the embodiment of FIG. 9, a steel wire 32 is embedded in the top wall of each tubular sheet 16' to keep it flat and parallel to the axis of the roll, preventing it from partially bulging like a barrel when gas is blown into the tubular sheet. As illustrated, the end wall of the tubular sheet 16' should preferably be not straight but curved to make it more flexible so that the end wall will yield to and absorb any irregularities on the surface of the running web and changes in the thickness of the web with the top wall of the tubular sheet 16' maintained parallel to the axis of the roll. The features of the tubular sheet as mentioned above serve to prevent partial abrasion or damage of the tubular sheet and the non-uniformity of the peripheral speed of the tubular sheet. If the distance between the inflated portions of the tubular sheets 16' is too wide for smooth feeding of the corrugated fibreboard web, separate elastic spacer members 30 may be mounted between the adjacent tubular sheets 16' to fill up "valleys" formed therebetween.

Figure 10:
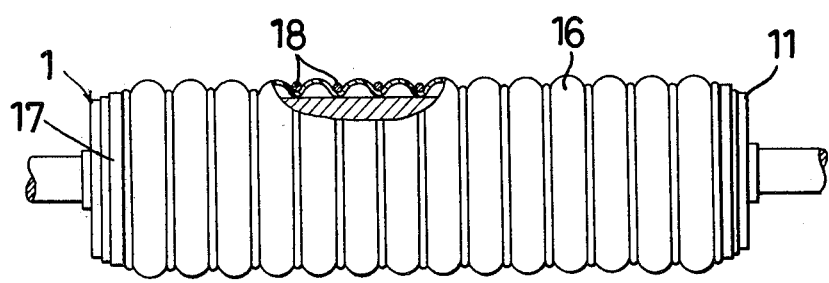

The embodiment of FIG. 10 comprises the roll body 11, a tubular sheet 16 mounted on the roll body, clamping bands 17 for securing the tubular sheet to the roll body at each end thereof, and seal means comprising a plurality of strings 18 annularly wound around the tubular sheet at suitable spacings to separate the space formed between the tubular sheet and the roll body into a plurality of gas-tight sections. The embodiment of FIG. 10 is similar to that of FIG. 9 except that a single tubular sheet is used and that strings 18 are used as seal means instead of wider bands 17.

Figure 11:
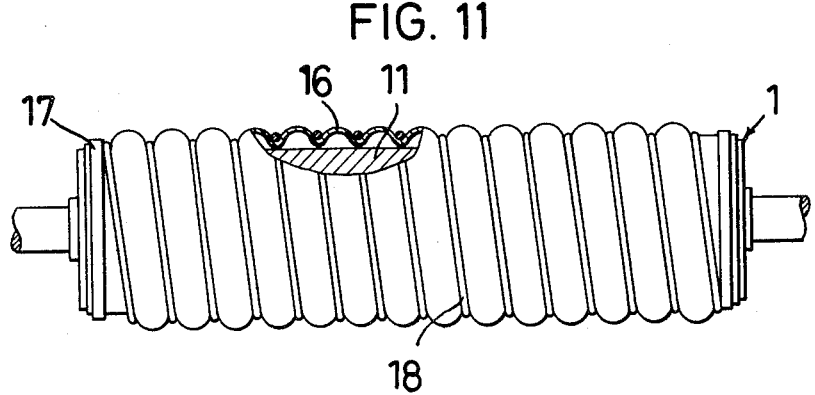

The embodiment of FIG. 11 is almost the same as that of FIG. 10 except that a single string 18 is spirally wound around the tubular sheet 16.

In the embodiments of FIGS. 8 to 11, too, gas supply passages formed in the roll body, a rotary joint for connecting a gas supply hose with the gas supply passage, and a gas supply port for forcing gas directly into each section (instead of the gas supply passage and rotary joint) may be provided as required, though some of them are not shown in the drawings.

In the embodiments of FIGS. 8 to 11, a stop valve or the like may be provided for each section of the space between the roll body and the tubular sheet to prevent the leakage of gas from any broken portion of the tubular sheet.

In the embodiments of FIGS. 3–11, tubes or tubular sheets are adapted to be inflated by forcing gas such as air thereinto as described above. The pressure of gas sealed therein is usually above atmospheric pressure, but, if the material of the tubes or tubular sheets permits, it may be substantially equal to atmospheric pressure. In other words, gas such as air may be merely sealed in the tube or tubular sheet. Furthermore, one or both ends of the tube or tubular sheets may not be sealed, but may be open. Also, the material of the tube or tubular sheet may be permeable to gas.

A third group of embodiments will be described with reference to FIG. 12. In this group, a tubular sheet of a synthetic resin material having a multiplicity of air bubbles on or in it is mounted on the roll body. In other words, the tubular sheet used has an elasticity in itself.

Figure 12:
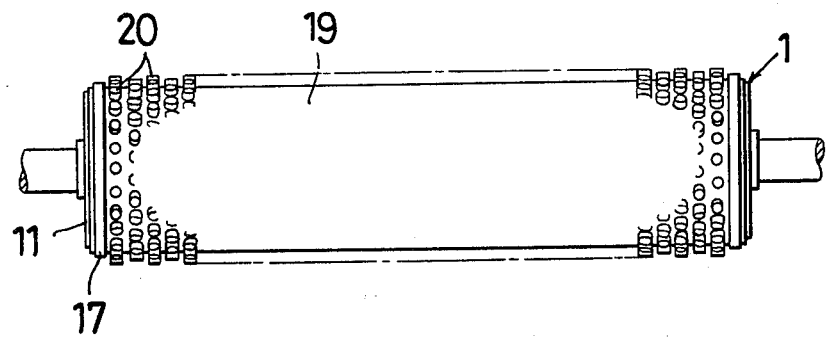

The embodiment of FIG. 12 comprises the roll body 11 and a tubular sheet 19 having a multiplicity of independent air bubbles 20 on it and mounted on the roll body to enclose its outer periphery and secured to the roll body at its each end by means of bands, strings, tapes or the like.

This type of tubular sheet may be replaced with a porous one having a multiplicity of continuous air bubbles in it like a sponge.

A fourth group of embodiments will be described with reference to FIGS. 13 to 17. They have a roll body whose outer periphery is enclosed by at least one elastic member having intrisically an elasticity.

Figure 13:
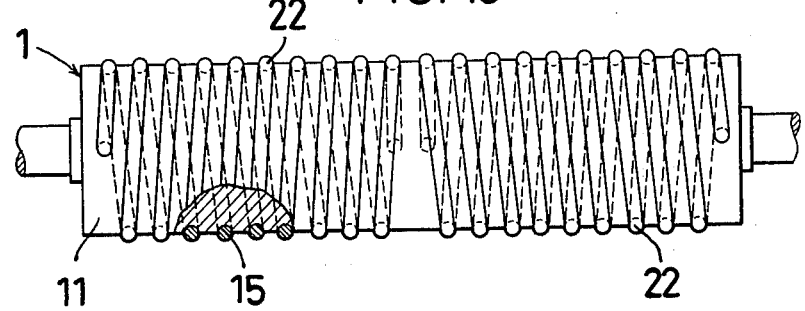

The embodiment of FIG. 13 comprises the roll body 11 and two elastic members 22 in the form of strings or rods spirally wound around the roll body. The elastic members may be fastened to the roll body 11 by means of adhesive, adhesive tapes or any other suitable fasteners. Preferably, the roll body 11 should be provided with spiral grooves 15 so as to partially receive the elastic members 22. This assures stable support of the elastic members on the roll body. In the embodiment of FIG. 13, two elastic members are wound spirally in opposite directions, starting from the roll center, to prevent the corrugated fibreboard web from running out of true.

Figure 14:
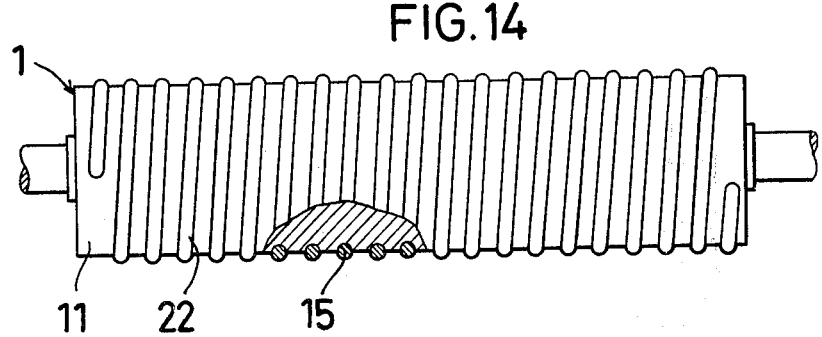

The embodiment of FIG. 14 is substantially the same as that of FIG. 13 except that a single elastic member 22 is spirally wound in one direction. In case the roll speed is high or the roll is narrow, the fibreboard web would not run out of true even if the elastic member is wound in a single direction.

Figure 15:
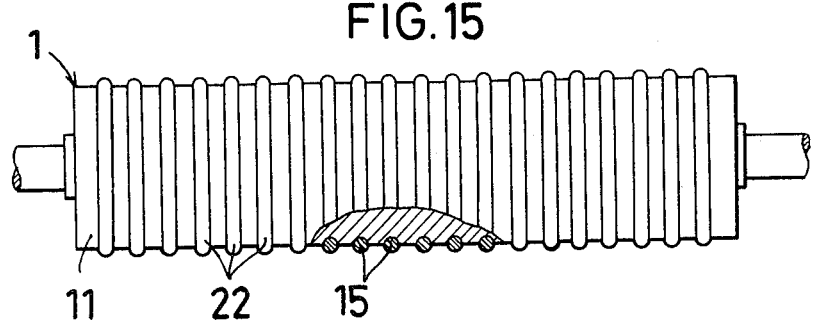

In the embodiment of FIG. 15, a plurality of annular elastic members 22 are mounted in annular grooves 15 formed in the outer periphery of the roll body 11 at suitable spacings.

In the embodiment of FIG. 16, a plurality of elastic members 22 are mounted on the roll body 11 so as to extend parallel with the axis of the roll body and with one another. Grooves 15 are formed in the outer periphery of the roll body 11 for stable support of the elastic members.

The embodiment of FIG. 17 differs from that of FIG. 16 only in that the elastic members 22 are mounted on the roll body 11 at an angle with respect to the axis of the roll body.

In any of the embodiments of FIGS. 13 to 17, the distance between the elastic members 22 should not be so large as to interfere with smooth feeding or passage of the corrugated fibreboard web. In any of the embodiments, the elastic members may be fastened by adhesives, adhesive tapes or any other suitable fasteners.

In the embodiments of FIGS. 13 to 17, each elastic member 22 is in the form of a rod or cord or string having a circular or rectangular cross-section. Therefore, these embodiments are advantageous in providing a greater elasticity of the elastic member and enabling a smaller amount of material used.

In the embodiments of FIGS. 5, 6, 10, 15 and 16, as well as in FIG. 9, the distance between the inflated portions of the tubes 12, tubular sheets 16 or 16', or elastic members 22 may be too wide for smooth feeding of the corrugated web, and thus elastic spacer members 30 may be mounted between the tubes, tubular sheets or elastic members to fill up the "valleys" formed therebetween, as illustrated in FIG. 21. The elastic spacer members 30 serve to ensure satisfactory feeding of the web as well as more secure nip of the web between the rolls or between the roll and the guide. The elastic spacer members 30 have substantially the same outer diameter as the tubular sheets 16' and have a suitable degree of elasticity so that when pressed by the running web, it will deform as much as the tubular sheets 16', thus maintaining the same outer diameter as the tubular sheets. Although the elastic spacer member 30 is illustrated in FIG. 21 in connection with the embodiment of FIG. 9 only, it may be used with the embodiments of FIGS. 5, 6, 10, 15 and 16.

The embodiment of FIG. 18 comprises the roll body 11 and a tubular elastic member 23 mounted on the roll body to enclosed its outer periphery and fastened to the roll body by means of bands, adhesive tapes or other means. Since the elastic member is in the form of a sheet, this embodiment is more advantageous in that the contact with the web will be on a larger area.

If it is to be secured to the roll body 11 by means of adhesive, the elastic tubular member 23 may be advantageously provided with an adhesive layer 24 on its inner surface as illustrated in FIG. 19.

The roll of FIG. 20 is the embodiment of FIG. 18 having the tubular elastic member 23 provided with a lining layer 25 on its outer surface to increase the strength, abrasion resistance and ease of cleaning of foreign matter clinging to its surface. Ease of cleaning is needed particularly for the rider roll which is liable to be soiled with splashed glue. This lining is required particularly if the elastic member 23 is made of foamed plastic.

The tube 12, tubular sheets 16, 16', 19, elastic member 22 and tubular elastic member 23 may be made of natural rubber, or synthetic rubber such as etylene vinyl acetate (EVA), butadiene rubber (BR), stylene butadiene rubber (SBR) or acrylonitrile butadiene rubber (NBR), or synthetic resin such as urethane or polyethylene, or any combination thereof. Preferably, they should have a good formability, processability, elasticity, heat resistance, ease of cleaning of foreign matter, and abrasion resistance. They may be constructed of either a layer or two or more layers made of the same or different materials. They may also be reinforced by interweaving the material with cloth or the like in a layer or between layers to increase the strength. Particularly the tubular sheets 16 and 16' may be interwoven with steel wires to maintain them in good shape for normal feeding of the web.

The lining 25 may be of synthetic resin such as polyester, nylon and silicon resin.

Natural rubber has a greater elasticity than synthetic rubber because of lower hardness, but synthetic rubber is better than natural rubber in abrasion resistance and heat resistance.

The advantages and effects of the roll in accordance with the present invention will be described below.

Firstly, if it is used as a rider roll at the gluing portion of a corrugating machine where the single-faced corrugated fibreboard web S passes between the glue roll 3 and the rider roll 5 (FIG. 1) to apply glue to the peaks of its corrugations, the roll 1 contacts the web not on a line but on a surface because of its elasticity so that the pressure applied to a unit area of the web S will be less than with a conventional steel roll. Since the roll 1 has some elasticity on its outer periphery, it can absorb shock, unevenness of the liner side of the web or some change in the thickness of the web. This advantage is marked particularly with the embodiments using gas to give elasticity to the roll so long as the pressure of the supplied gas is suitable. The nip pressure can be easily adjusted by adjusting the pressure of gas supplied which can be seen on a meter.

In contrast to the conventional steel rider roll which cannot absorb such changes or shock, the roll according to this invention ensures that the web is pressed by the roll with a pressure sufficient to assure the application of an appropriate amount of glue but not so excessive as to deform the corrugations. This helps to minimize the possibility of producing defective webs such as corrugation-deformed webs or poorly glued or warped webs and to increase production. Further, the adjustment of the clearance between the rolls according to the change of material, flute type, etc. is no longer needed. This is particularly true for the embodiments using gas to give elasticity to the rolls.

If the roll in accordance with the present invention is used as a weight roll at the heating portion of a corrugating machine, the roll 1 also contacts the web not on a line but on a surface so that the pressure applied to a unit area of the web will be much less than with the conventional steel roll even though the total nip pressure remains the same. This makes it possible to increase the pressure to the corrugated fibreboard web without the fear of deforming the corrugations, resulting in better heat transfer efficiency, higher machine speed and larger production per unit time. Further, because the roll according to this invention can absorb any irregularity on the surface of the cotton belt at the laced portions and any other bulging portions, it eliminates the need of readjusting the position of the weight rolls according to change in the material, flute type, etc.

Similarly, if the roll according to this invention is used as feed rolls upstream of the rotary cutter D (FIG. 2), the web is contacted by the upper and lower rolls on a surface, not on a line, so that the possibility of causing deformation of the corrugations is extremely reduced. Since the contact area between the roll and the web increases, larger frictional forces required to feed the web can be obtained. This decreases the nip force required for the rolls, thus decreasing the possibility of deforming the corrugations. This is particularly true when a material having a large frictional resistance is selected as the material by which the roll body is covered.

The roll in accordance with the present invention may be used either as a roll wide enough to cover the entire width of the web or as a shorter roll covering only part of its entire width, such as an auxiliary feed roll.

Although preferred embodiments have been described, it is to be understood that changes and variations may be made within the scope of the invention.

What is claimed is:

1. A flexible roll for use in pressing toward a web of corrugated fibreboard during the production thereof, said roll comprising:
   a cylindrical roll body having an outer surface;
   a plurality of flexible tubular sheets positioned about said outer surface of said roll body and arranged axially of each other along said roll body, each said tubular sheet having opposite axial ends;
   means for fastening and sealing said opposite axial ends of said tubular sheets to said outer surface of said roll body, and thereby for defining between said outer surface of said roll body and the inner surface of each said tubular sheet a space;
   each said space being inflated with a gas, thereby expanding outwardly the respective said tubular sheet between said opposite ends thereof;
   each said outwardly expanded tubular sheet having an uncovered outer surface, said outer surfaces of said plurality of tubular sheets defining a radially elastic outer periphery of said roll; and
   each pair of axially adjacent said outwardly expanded tubular sheets defining between adjacent end portions thereof an annular radial gap, each said gap being filled substantially by an elastic annular spacer member.

2. A roll as claimed in claim 1, wherein each said spacer member has an outer annular surface aligned substantially with said outer surfaces of said adjacent outwardly expanded tubular sheets.

3. A roll as claimed in claim 1, wherein said fastening and sealing means comprise a plurality of annular bands, each said band sealingly clamping adjacent said axial ends against said roll body, and each said spacer member is positioned radially outwardly of a respective said band.

4. A roll as claimed in claim 1, wherein each said outwardly expanded tubular sheet includes a cylindrical portion defined by said outer surface and opposite end portions extending inwardly to respective said opposite axial ends, each said end portion being radially curved.

5. A flexible roll for use in pressing toward a web of corrugated fibreboard during the production thereof, said roll comprising:
   a cylindrical roll body having an outer surface and first and second opposite axial ends;
   a plurality of elongated elastic members each having first and second opposite ends;
   said elastic members being mounted on said outer surface of said roll body in generally parallel alignment, each said elastic member being aligned to extend substantially longitudinally with said first and second ends thereof located adjacent said first and second axial ends, respectively of said roll body;
   each said elastic member having an uncovered outer surface extending outwardly from said outer surface of said roll body, said outer surfaces of said plurality of elastic members defining a radially elastic outer periphery of said roll; and
   each said elastic member comprising a hollow flexible tube.

6. A roll as claimed in claim 5, wherein said elastic members extend in directions parallel to the axis of said roll body.

7. A roll as claimed in claim 5, wherein said elastic members extend in directions inclined at an acute angle with respect to the axis of said roll body.

8. A roll as claimed in claim 5, wherein said roll body has formed in said outer surface thereof a plurality of substantially longitudinal grooves, and each said elastic member is received partially within a respective said groove.

9. A flexible roll for use in pressing toward a web of corrugated fiberboard during the production thereof, said roll comprising:
   a cylindrical roll body having an outer surface;
   a tubular sheet formed of a synthetic resin material and mounted about said roll body to cover and be in contact with substantially the entire said outer surface thereof;
   said tubular sheet having formed within the thickness thereof a plurality of independent gas bubbles forming a plurality of radially outwardly raised portions; and
   said outwardly raised portions having outer surfaces together defining a radially elastic outer periphery of said roll.

10. A flexible roll for use in pressing toward a web of corrugated fibreboard during the production thereof, said roll comprising:
    a cylindrical roll body having an outer surface and first and second opposite axial ends;
    a plurality of elongated elastic members each having first and second opposite ends;
    said elastic members being mounted on said outer surface of said roll body in generally parallel alignment, each said elastic member being aligned to extend substantially longitudinally with said first and second ends thereof located adjacent said first and second axial ends, respectively of said roll body;
    each said elastic member having an uncovered outer surface extending outwardly from said outer surface of said roll body, said outer surfaces of said plurality of elastic members defining a radially elastic outer periphery of said roll; and
    said elastic members extending in directions inclined at an acute angle with respect to the axis of said roll body.

11. A roll as claimed in claim 10, wherein each said elastic member comprises a hollow flexible tube.

12. A roll as claimed in claim 10, wherein each said elastic member comprises a solid elastic body.

13. A roll as claimed in claim 10, wherein said roll body has formed in said outer surface thereof a plurality of substantially longitudinal grooves, and each said elastic member is received partially within a respective said groove.

* * * * *